United States Patent [19]

Gertel

[11] Patent Number: 5,426,433

[45] Date of Patent: Jun. 20, 1995

[54] COHERENT RF PULSE MULTIPLIER

[75] Inventor: Eitan Gertel, Lansdale, Pa.

[73] Assignee: AEL Industries, Inc., Lansdale, Pa.

[21] Appl. No.: 121,129

[22] Filed: Sep. 14, 1993

[51] Int. Cl.$^6$ .................................................. G01S 7/38
[52] U.S. Cl. ........................................ 342/15; 342/172
[58] Field of Search .............................. 342/15, 14, 172

[56] References Cited

U.S. PATENT DOCUMENTS

| | | | |
|---|---|---|---|
| 3,543,295 | 11/1970 | Overstreet, Jr. | 328/38 |
| 3,623,098 | 11/1971 | Jones et al. | 342/91 |
| 3,808,594 | 4/1974 | Cook et al. | 342/201 |
| 4,507,795 | 3/1985 | Wagner | 375/95 |
| 4,513,447 | 4/1985 | Carson | 455/76 |
| 4,570,089 | 2/1986 | Nagano | 307/529 |
| 4,983,978 | 1/1991 | Levinson | 342/200 |
| 5,019,826 | 5/1991 | de la Chapelle et al. | 342/202 |
| 5,053,780 | 10/1991 | Thaler et al. | 342/200 |
| 5,146,616 | 9/1992 | Tang et al. | 455/103 |
| 5,239,309 | 8/1993 | Tang et al. | 342/13 |

FOREIGN PATENT DOCUMENTS 1-319321 12/1989 Japan .

Primary Examiner—John B. Sotomayor
Attorney, Agent, or Firm—Seidel Gonda Lavorgna & Monaco

[57] ABSTRACT

A radio frequency pulse multiplier for producing coherent multiples of radio frequency (rf) pulses comprising an input terminal for receiving rf pulses, a signal divider for providing a plurality of pulses in response to an input pulse, the output of the signal divider coupled to a plurality of signal paths, each respective path comprising a time delay element providing a selectable delay to a respective pulse, a signal combiner for combining the plurality of pulses on a single output, and an output terminal. The output of the multiplier comprises pulses delayed by amounts equal to the preselected delays in the respective signal paths of the multiplier. The multiplier may comprise signal conditioning elements for conditioning the rf pulses within the multiplier. In another embodiment of the invention, a plurality of the pulse multiplier may be arranged in a cascade, whereby the cascade produces a number of pulses that is the arithmetic product of the number of pulses produced in the respective stages of the cascade. The multiplier may further embody a notch filter for substantially rejecting an rf pulse train of frequency f by selecting the time delay equal to the period 1/f of the input pulse frequency.

12 Claims, 2 Drawing Sheets

COHERENT RF PULSE MULTIPLIER

FIELD OF THE INVENTION

The present invention relates to the fields of radar signal processing, electronic warfare, and pulsed radio frequency systems. The radio frequency pulse multiplier described herein is applicable to pulsed radio frequency (rf) systems in which integer multiples of a pulsed rf input must be created, systems requiring that the multiplied pulses be coherent with the original rf pulse input, and systems in which aperiodic rf pulses must be duplicated and/or delayed.

BACKGROUND OF THE INVENTION

Radar systems employ pulsed rf signals, commonly though not necessarily in the microwave frequencies, to determine the existence, location, range, velocity and direction of movement of various types of targets. In electronic warfare applications particularly, it is often desirable to be able to create new rf pulses from an original pulse or train of pulses. The newly created pulses may be employed to generate false targets, ghost images, jamming effects, and other information misleading to hostile radar. Radar simulation and training equipment may also employ the effects generated by controllable rf pulse multiplication.

Because the phase of the transmitted and received rf pulses is often a critical element in the detection and processing of radar images, radar receivers frequently use phase-locking local oscillators to perform coherent detection of the incoming rf pulses. Thus, it is desirable that multiplied rf pulses also maintain coherence with the original source rf pulses. Heretofore, detecting rf pulses from a source and reproducing coherently-related multiples of those pulses has required complex circuits to establish a phase reference with the source pulse(s) and generate new rf pulses with the proper phase and time relationships to the source pulse(s).

The present invention eliminates the need for complex detection or phase-locking circuits for coherent rf pulse multiplication. The coherent rf pulse multiplier herein disclosed enables the source rf pulse to replicate itself, without regeneration from another source. Coherence of the replicas with the source pulse(s) and with each other is a natural consequence of the apparatus, and requires no external circuits to accomplish.

SUMMARY OF THE INVENTION

The present invention is a coherent radio frequency pulse multiplier. The multiplier comprises an input terminal for receiving pulsed rf signals coupled to a signal divider. The signal divider provides a plurality of output pulses, each a replica of the input pulse, and couples them to a plurality of respective signal paths. The respective signal paths comprise a time-delay element that is adjustable to a preselected delay, each delay element being adjusted to a different delay. The respective signal paths are coupled to respective inputs to a signal combiner such that pulses having different respective delays comprise the input to the combiner. The respective pulses are combined and coupled to an output terminal. The output comprises a plurality of pulses equal to the number produced by the signal divider, each delayed by an amount determined by the respective delay elements in the multiplier.

In one embodiment of the invention, all the output pulses are delayed, while in an alternative embodiment one signal path in the multiplier comprises substantially no delay, such that a pulse appears at the output substantially undelayed relative to the input pulse. The output pulses from the multiplier are coherent, being replicas of the same input pulse.

One embodiment of the invention produces two rf pulses from a single input rf pulse. The input rf pulse is divided into two pulse signals by the signal divider. One of the pulses is delayed by a delay element such as a delay line in one of the signal paths. The amount of delay is referred to herein as $\tau$. The delayed and non-delayed signals are recombined in the signal combiner and appear on the output terminal as two distinct, coherent rf pulses. Phase coherence is assured because the delayed pulse is a replica of the input pulse.

Other embodiments of the basic multiplier can produce greater multiples of the input rf pulses. Successive division of the input signal into more than two paths permits the creation of more replicas of the input rf pulse. Each replica may be delayed by a different amount to produce a string of rf pulses at the output of the multiplier. The number of pulses produced for each input pulse is determined by the number of successive pulse signal divisions.

The pulse multiplier of the invention may be combined in a cascade comprising a plurality of individual multiplier stages to produce $2^n$ coherent output rf pulses for each input rf pulse. In a cascaded multiplier, the delay imparted in each stage of the cascade is increased. Generally, the sequence of delays is $\tau, 2\tau, 4\tau \ldots 2^{(n-1)}\tau$, (i.e. is binary) where n equals the number of multiplier stages in the cascade.

In a further embodiment of the present invention, the multiplier can function as a signal filter. The delay $\tau$ can be set to equal the period of an rf pulse train input of frequency f. Where $\tau = 1/f$, the non-delayed rf pulses passing through the multiplier are cancelled in the signal combiner by the delayed pulses. The rf pulse multiplier thus may become a band-reject filter tuned to reject a pulse frequency f which is the reciprocal of the delay $\tau$.

The present invention has direct application to radar electronic warfare (ew) and radar simulation technologies. The pulse multiplier according to the invention can be used in both offensive and defensive ew systems to generate false targets with duplicates of actual target reflections. Rapid adjustment of the delays or multiplier factor may make actual target identification by hostile radar more difficult. Large multiples of rf image pulses can be employed to flood a hostile receiver and obscure actual targets. The filter capability may be applied to jamming techniques, or to make hard targets appear to disappear.

Numerous other advantages offered by the multiplier of the present invention will be discerned by those skilled in the art of pulsed rf signal processing.

DESCRIPTION OF THE DRAWINGS

For the purpose of illustrating the invention, there are shown in the drawings forms which are presently preferred, it being understood, however, that this invention is not limited to the precise arrangements and embodiments shown.

DESCRIPTION OF THE INVENTION

Figure 1:
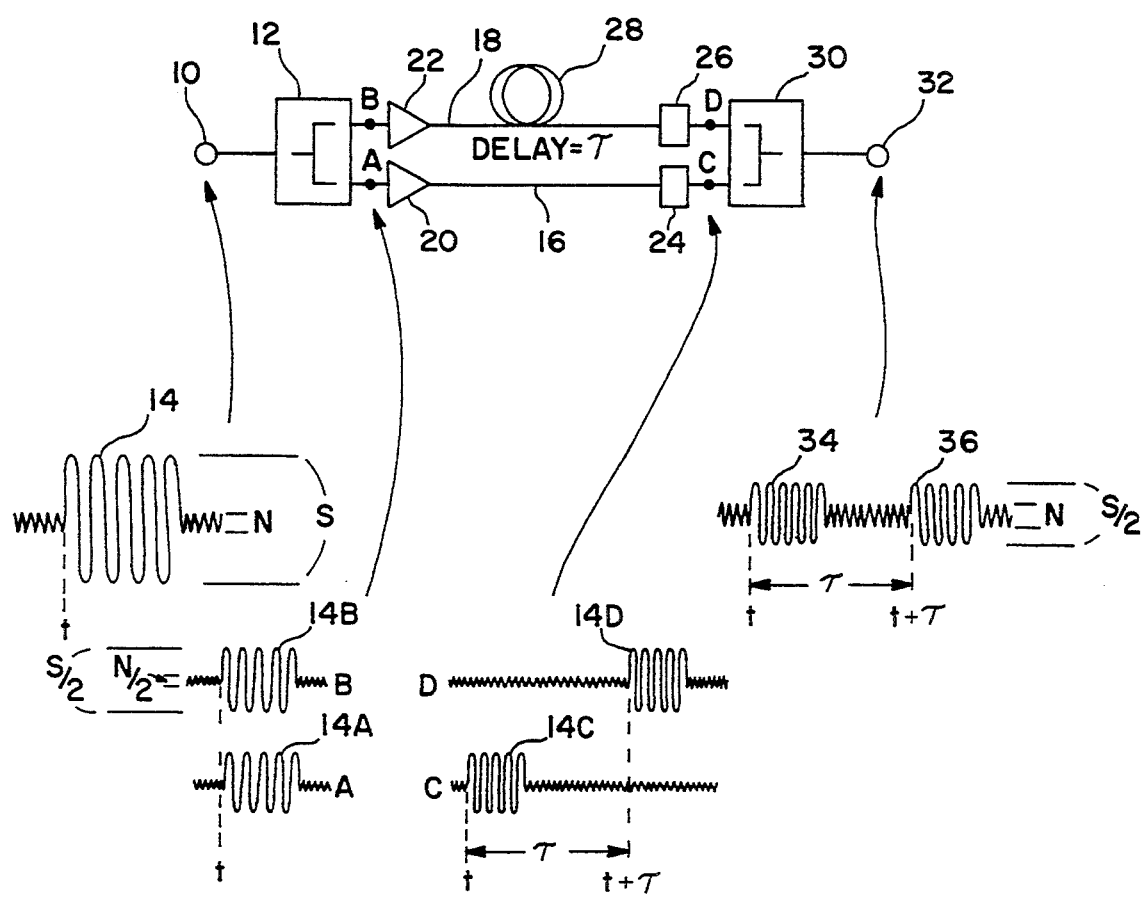
FIG. 1 is a block diagram of a pulse multiplier according to the present invention with corresponding signal diagrams.

Referring to FIG. 1, there is illustrated one embodiment of a pulse multiplier according to the present invention. The pulse multiplier comprises an input terminal 10 coupled to a signal divider 12. The signal divider 12 splits an input rf pulse signal into identical replicas of the input pulse. An input rf pulse 14 is shown in FIG. 1 as it would appear applied to the input terminal 10, its leading edge occurring at time t. The input signal comprises a pulse component and a noise component. The input signal has a pulse component of amplitude S. In the absence of an rf pulse there is a noise component of amplitude N present on the input 10 of the multiplier.

Divider 12 splits the input pulse 14 into two pulses 14A and 14B, which are shown as they appear at points A and B indicated on the block diagram in FIG. 1. Pulses 14A and 14B are duplicates of each other, having the same frequency components and the same phase, with the pulse power of input pulse 14 divided substantially equally between them. Thus, each pulse 14A and 14B has approximately half the amplitude S of input pulse 14. The noise power is also split, so that the noise level of signals 14A and 14B is also approximately half the amplitude of the noise level of input signal 14. The leading edge of each pulse occurs at time t, the propagation delay through the divider 12 being negligible.

Pulses 14A and 14B traverse signal paths 16 and 18 respectively. In the pulse multiplier embodiment shown, signal paths 16,18 contain amplifiers 20,22 and attenuators 24,26 respectively. These devices are provided for signal conditioning only and have no effect on the multiplication function.

Pulse 14B passes through time-delay element 28 on signal path 18 of FIG. 1. The delay element 28 imparts a preselected delay to the rf pulse on path 18. The length of the delay is denoted $\tau$. Pulse 14A passes along signal path 16 substantially undelayed.

FIG. 1 shows the relative time relationship between the two pulses labeled 14C and 14D at the points indicated as C and D in the block diagram. Pulse 14C arrives non-delayed at time t. Pulse 14D arrives at time $t+\tau$ because it passed through delay element 28.

Referring again to FIG. 1, the signal paths 16, 18 carrying rf pulses 14C and 14D are combined in signal combiner 30 onto a single path coupled to output terminal 32. The signal diagram illustrates the output of the rf pulse multiplier. Two pulses 34,36 appear on the output terminal 32 of FIG. 1 separated by time interval $\tau$. The pulses 34,36 are coherent because they are replicas of the same input pulse 14. Any phase change caused by the multiplier affects both pulses equally. Thus, the phase relation between the pulses is not changed by the multiplier, though the phase of the replicated pulses changes as a consequence of encountering the signal conditioning elements 20, 22, 24, 26 in the multiplier.

In the embodiment of the invention shown in FIG. 1, pulse 36 is non-delayed relative to the original input pulse while only pulse 34 is delayed. It is possible to construct multipliers according to the present invention which produce output pulses that are all delayed relative to the input pulse. Referring again to FIG. 1, insertion of a delay element in signal path 16 having a preselected delay of $3\tau$, for example, would produce two output pulses delayed by $\tau$, and $3\tau$ respectively, relative to the input pulse.

The length of time delay $\tau$ depends upon the system in which the pulse multiplier is used. For example, in radar systems the range to a target is determined by the length of time between the transmission of an rf pulse and receipt of the pulse's reflection from the target. The present invention permits the generation of false targets by producing multiples of received pulses. The value of $\tau$ determines the apparent range to the false targets. Thus, the value of $\tau$ depends upon the use of the multiplied pulses within a given system.

The limits on the parameter in any system which is measured by or dependent upon the time interval between the pulses likewise limit the useful length of the delay $\tau$. In the previous example, any radar has a finite effective range. Therefore, the length of $\tau$ is limited by that range beyond-which the radar is not useful. It would serve no purpose to generate false targets beyond the radar's range limit.

The total output power of the multiplied signal pulses from any multiplier can be equal to the input pulse power. Where proper attention is given to selecting a balanced signal divider, the multiplied pulses can be substantially equal in relative signal power without sensitive gain adjustment within the multiplier. If signal conditioning, such as that represented by amplifiers 20,22 and attenuators 24,26 in FIG. 1, has not added gain or introduced loss into the multiplier, it can be expected that the input signal amplitude S is reduced to S/2 at the output terminal 32. The total signal power of the input pulse 14 of FIG. 1 is divided equally between the output pulses 34,36. The output noise amplitude level is N, the result of combining two noise components of N/2.

After the signal division in signal divider 12 in FIG. 1, the resulting rf pulses may have their amplitude adjusted as desired. Thus, amplifiers 20,22 may increase the amplitude of the pulse signals after division. Amplifiers 20,22 may additionally serve as buffers, providing isolation of the input terminal from signal reflections and minimizing the propagation of other undesirable effects in the reverse direction. The attenuators 24,26 serve a similar purpose and are commonly used in rf applications for amplitude adjustment, isolation and impedance matching. Therefore, the amplitude of the rf pulses may be varied according to the requirements of the system in which the multiplier operates. Accordingly, the signal conditioning components employed in any individual embodiment of the present invention may differ from other embodiments, without departing from the invention.

A multiplication factor m in a single-stage multiplier, like that shown in FIG. 1, may be determined by the number of pulse signals derived from the signal division step at the input of the multiplier. In FIG. 1 two pulses were created from the input rf pulse, one of which was delayed on its path to the output of the multiplier to produce two distinct pulses. Thus, the multiplier of FIG. 1 has a multiplication factor m equal to 2. Other embodiments of the invention are possible where the signal division can produce three or more pulse signals. In such embodiments, all, or all but one of the duplicated pulses would be delayed, each by a different amount (i.e., $\tau_1, \tau_2 \ldots \tau_{(m-1)}$, where m is the multiplication factor desired). Multiplication factors of higher integer values may be realized in such embodiments of the invention. The delays $\tau_1, \tau_2 \ldots \tau_{(m-1)}$ may be, but need not be, equal.

The delays may be chosen as desired for a particular application and must take into account whether the input rf pulses are to be random, isolated pulses or pulse trains of a certain periodicity. Where regular periodic input is expected, comprising pulses $P_1, P_2 \ldots P_n$ at frequency f, the delay or aggregate delays in most cases should be less than the period 1/f of the input pulses. This assures that the multiples of any input pulse $P_1$ appear at the output of the multiplier before the appearance of undelayed pulse $P_2$ and its multiples.

The delay $\tau$ need not be restricted in this manner where the input rf pulses are expected to be singular or random. In any event, unless the purpose of the multiplier is to obscure images represented by the input pulses, such as when the multiplier is used in electronic warfare, the value of $\tau$ should be greater than the duration (pulse width) of the input pulse. This assures that the output multiples will be clearly separated from each other. The amount of separation is determined according to the effect to be created in the system by the multiplied pulses. Delays less than the duration of the input pulse produce interference between the pulses at the output of the multiplier, making them indistinguishable. These considerations are well-known and will be appreciated by those skilled in the art of pulsed rf signal processing.

The means for accomplishing signal division and recombination in multipliers constructed according to the present invention may be of any type commonly employed for rf signal division and combination in other rf applications. Balanced transformer signal splitters and combiners, coaxial splitters and combiners, active devices, circulators, and amplifiers are among the devices available, though others may also be used. The choice is influenced primarily by the frequency range in which the multiplier is to operate. The present invention, though well suited to radar applications, is not limited to millimeter wave processes and may be applied in other frequency bands.

The same considerations apply to the selection of an appropriate delay element in the multiplier. Delay devices are well-known in the art of rf signal processing, and include lumped element delay lines at lower frequencies, coaxial and helical delay lines at higher frequencies, and surface acoustical wave delay lines for microwave applications. In electronic warfare and radar simulation applications, it will be desirable to have a number of different selectable delays available for use in the multiplier. Selection may be by analog or digital control means. Varying delays make the multiplier adaptable for use with a wider range of pulse frequencies and capable of generating more diverse effects.

More complex embodiments of the present invention can be employed to generate progressively higher multiples of the input rf pulses. The basic m=2 multiplier shown in FIG. 1 can be cascaded in a plurality of stages to create a complex multiplier with binary weighted outputs. Such a multiplier is illustrated in FIG. 2.

Figure 2:
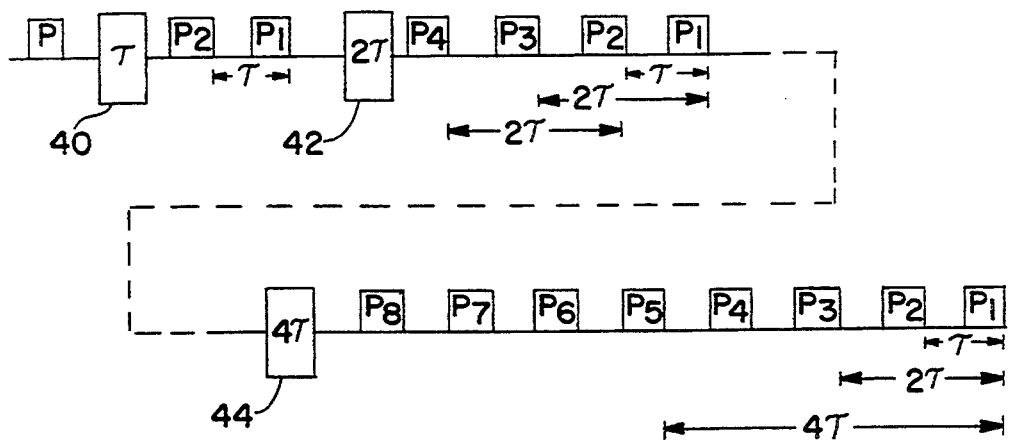
FIG. 2 is a representation of the radio frequency pulse multiplication which takes place in one embodiment of a cascaded pulse multiplier.

FIG. 2 shows a block diagram illustration of a three-stage binary multiplier. The multiplier comprises three m=2 multipliers, each like the one shown in FIG. 1. Each multiplier imparts a different delay to the pulses passing through it. For any input pulse P, the first stage 40 produces two pulses $P_1, P_2$ separated by $\tau$. The second stage 42 multiplies the previous two pulses into four pulses, producing two new pulses $P_3, P_4$ delayed by $2\tau$ after the input pulses $P_1, P_2$. These four pulses pass through the third stage 44 and produce four more pulses, $P_5$–$P_8$, each delayed $4\tau$ after the original.

A binary multiplier produces $2^n$ pulses, where n is the number of stages in the complex multiplier. Thus, for the three-stage binary multiplier of FIG. 2, n=3, and the multiplier produces 8, or $2^3$, pulses.

Figure 3:
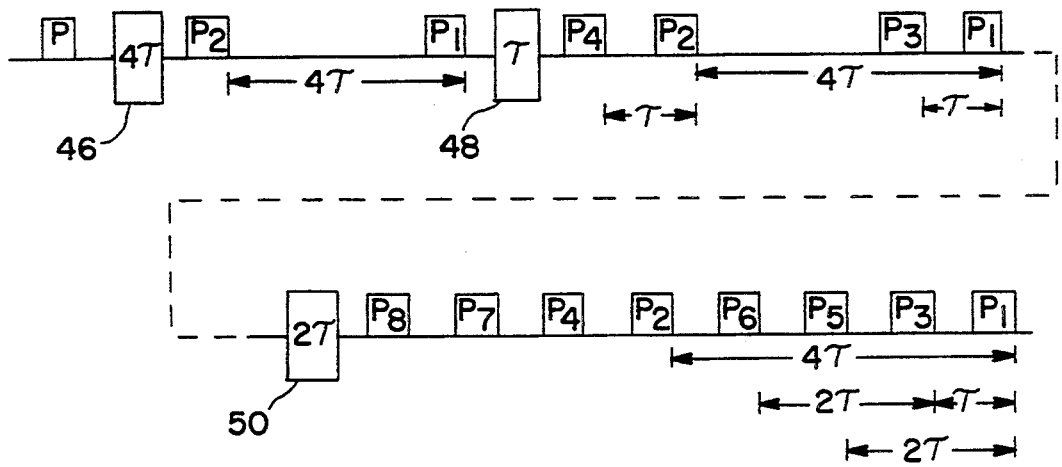
FIG. 3 is a representation of an alternative pulse multiplication scheme produced by a modified embodiment of the cascaded multiplier.

Because each stage in a cascade of multiplier stages produces a unique output, users may choose to tap these interstage outputs to contribute to the capabilities of the system in which the cascaded multiplier is used. FIG. 3 is an illustration of a variation of the binary multiplier cascade. The individual stages of the binary multiplier may be arranged in varying sequences to obtain different pulse separations. This offers users the opportunity to use inter-stage pulse products for varying effects. The ability of the invention to vary these effects is illustrated by a comparison of FIGS. 2 and 3.

In FIG. 2, described above, the multiple pulses are separated by $\tau$ at the output of each stage. FIG. 3 depicts the output of the successive stages of an alternative embodiment of a three-stage binary multiplier arranged according to the present invention. In this embodiment, the same delays are employed as in the multiplier of FIG. 2, but they are arranged in a different sequence.

In FIG. 3, the first multiplier stage 46 imparts a delay of $4\tau$; the second stage 48 delay is $\tau$; the third stage 50 delay is $2\tau$. The ultimate output of the multiplier of FIG. 3 is eight pulses, the same as the multiplier of FIG. 2. In both embodiments, the complex binary multiplier produces two pulses in the first stage, four in the second stage, and eight in the third stage. However, the intervals between the pulses that result at the outputs of the first stage 46 and the second stage 48 of FIG. 3 differ markedly from the first stage 40 and second stage 42 output intervals of FIG. 2. The two pulses produced by the first stage 46 in FIG. 3 are separated by $4\tau$ compared to the separation of $\tau$ between the pulses created by the first stage 40 of FIG. 2. After the second stage 48 of FIG. 3, two pairs of pulses $3\tau$ apart are created.

In systems where variable pulse groupings and intervals are desirable, as in electronic warfare systems, this feature can be useful. Not only is the third stage 50 eight-pulse-output available, but the outputs of the intermediate first and second stages 46,48 can be employed for alternative effect. These results permit designers to be more creative in the application of the complex multipliers constructed according to the invention.

Other complex multipliers consisting of multiple stages may be assembled yielding other integer multiples of the input pulses using the technique of the present invention. The multiplication factor m of the cascaded multiplier is the arithmetic product of the multiplication factors of the respective stages of the cascade. For example, a three-stage multiplier in which the multiplication factors of the individual stages were $m_1=2$, $m_2=3$, $m_3=2$ would have a combined value of m equal to $m_1 \times m_2 \times m_3$ ($2 \times 3 \times 2$). Each multiplier, regardless of the multiple factor embodied in it, retains the advantage of output pulse phase coherence.

Figure 4:
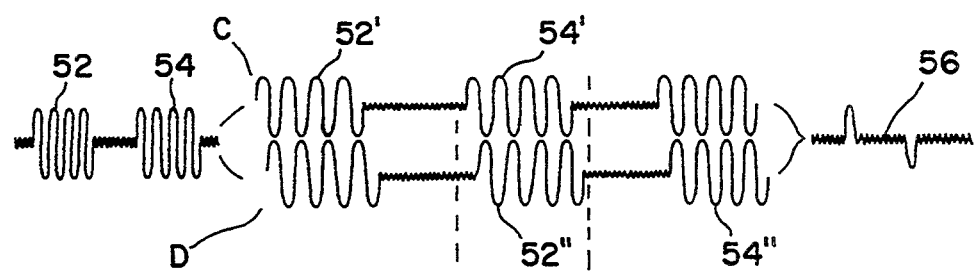
FIG. 4 is a representation of the application of the present invention as a band-reject filter for periodic rf pulses.

FIG. 4 illustrates a further application of the present invention. When operating on a periodic rf pulse input signal, the basic rf pulse multiplier of FIG. 1 may be employed as a highly selective band-reject (notch) filter. Referring to FIG. 4, the input pulses 52, 54 represent a periodic rf pulse input of frequency f. The period of the input frequency, that is, the time between the leading edge of the first pulse 52 and the leading edge of the second pulse 54, is $1/f$.

If the delay element 28 of FIG. 1 is set to impart a time-delay of $\tau = 1/f$ to the delayed pulse, the pulse waveform appearing at the points labeled C and D in FIG. 1 would appear as the pulses on the paths labeled C and D in FIG. 4. Undelayed pulse 52', on path C, has a delayed counterpart 52" on path D. Pulse 52" coincides with undelayed pulse 54' on path C. Pulse 54' on path C has a delayed counterpart 54" on path D. Each delayed pulse coincides in time with the following undelayed pulse.

With an appropriate fine adjustment so that the time-delay results in a 180 degree phase difference between the coinciding pulses, the coinciding pulses 52" and 54' substantially cancel each other as they pass through the signal combiner 30 of FIG. 1. Successive pulses are likewise substantially cancelled. The resulting output waveform 56 is shown in FIG. 4. The pulse multiplier effectively becomes a band reject filter which substantially attenuates the pulses at frequency f. A small portion of the pulse waveform appears at the output of the multiplier notch filter. That is a result of the slight offset between the leading and trailing edges of the pulses created by the adjustment to achieve a 180 degree phase difference between the delayed and non-delayed pulses.

The present invention may be embodied in other specific forms without departing from the spirit or essential attributes thereof and, accordingly, reference should be made to the appended claims, rather than to the foregoing specification, as indicating the scope of the invention.

I claim:

1. A radio frequency pulse multiplier for producing coherent multiples of radio frequency pulses, comprising an input terminal for receiving pulsed radio frequency signals, said input terminal being coupled to an input of a signal divider having a plurality of signal outputs, said signal divider providing an output pulse on each signal output in response to an input pulse, each signal output being coupled to a respective signal path, each signal path being connected to an input of a signal combiner, one of said signal paths providing a substantially non-delayed pulse to said signal combiner and the remaining signal paths comprising respective delay elements for delaying discrete pulses on the respective paths by a preselected delay amount, the respective paths each producing a single time-domain delayed pulse for each input pulse, said signal combiner combining the non-delayed pulse and the respective delayed pulses into a single output comprising discrete coherent radio frequency pulses.

2. A radio frequency pulse multiplier for producing coherent multiples of radio frequency pulses, comprising an input terminal for receiving pulsed radio frequency signals, said input terminal being coupled to an input of a signal divider having a plurality of signal outputs, said signal divider providing an output pulse on each signal output in response to an input pulse, each signal output being coupled to a respective signal path, each signal path being connected to an input of a signal combiner, each signal path comprising a respective delay element for delaying discrete pulses on the respective paths by a preselected delay amount, the respective paths each producing a single time-domain delayed pulse for each input pulse, said signal combiner combining the respective delayed pulses into a single output comprising discrete coherent radio frequency pulses.

3. The radio frequency pulse multiplier of claim 1 or 2, further comprising signal conditioning elements for conditioning pulse signals traversing the respective signal paths of the multiplier.

4. A plurality of the coherent radio frequency pulse multiplier of claim 1 or 2 arranged in a cascade, each respective multiplier comprising a stage of the cascade having an input and an output, the output of a preceding stage supplying the input to a succeeding stage, whereby the cascade produces a number of radio frequency pulses that is an arithmetic product of the number of pulses produced by the respective stages of the cascade.

5. A radio frequency pulse multiplier for producing coherent multiples of radio frequency pulses, comprising an input terminal for receiving pulsed radio frequency signals, said input terminal being coupled to an input of a signal divider having first and second signal outputs, said signal divider providing first and second output pulses in response to an input pulse, said first and second pulses being coupled to first and second signal paths, each signal path being connected to an input of a signal combiner, the first signal path providing a substantially non-delayed pulse to said signal combiner, the second signal path comprising a time delay element for delaying discrete pulses on the second path by a preselected time-domain delay amount, said signal combiner combining the non-delayed pulses and the delayed pulses into a single output comprising discrete coherent radio frequency pulses.

6. The radio frequency pulse multiplier of claim 5, the time delay element being adjustable to provide a predetermined time delay, $\tau$.

7. The radio frequency pulse multiplier of claim 5, further comprising signal conditioning elements for conditioning radio frequency pulse signals in the first and second signal paths.

8. A plurality of the coherent radio frequency pulse multiplier of claim 5 arranged in a cascade, each respective multiplier comprising a stage in the cascade having an input and an output, the output of a preceding stage supplying the input to a succeeding stage, whereby the cascade produces $2^n$ output pulses for each input pulse to the cascade, where n is the number of multiplier stages in the cascade.

9. The radio frequency pulse multiplier cascade of claim 8, wherein the delay elements in the plurality of multiplier stages impart respective time-delays of $\tau$, $2\tau$, $4\tau \ldots 2^{(n-1)}\tau$, where n is the number of multiplier stages in the cascade.

10. A radio frequency pulse multiplier for producing coherent multiples of radio frequency pulses, comprising an input terminal for receiving pulsed radio frequency signals, said input terminal being coupled to an input of a signal divider having first and second signal outputs, said signal divider providing first and second output pulses in response to an input pulse, said first and second pulses having substantially equal power, the signal outputs of the divider being coupled to first and second buffer amplifiers, said buffer amplifiers having outputs coupled to first and second signal paths, each signal path comprising an attenuator having an output connection to an input of a signal combiner, the respective signal paths comprising respective time delay elements for delaying discrete pulses on the respective signal paths by a preselected delay amount, the respective paths each producing a single time-domain delayed pulse for each input pulse, said signal combiner combining the respective delayed pulses into a single output comprising discrete coherent radio frequency pulses.

11. The radio frequency pulse multiplier of claim 10, the preselected delay amount in the first signal path being substantially zero.

12. A tunable notch filter for substantially rejecting a radio frequency pulse signal of frequency f and period 1/f comprising a coherent radio frequency pulse multiplier, said pulse multiplier comprising an input terminal for receiving pulsed radio frequency signals, said input terminal being coupled to an input of a signal divider having first and second signal outputs, said signal divider providing first and second output pulses in response to an input pulse, said first and second pulses being coupled to first and second signal paths, each signal path being connected to an input of a signal combiner, the first signal path providing a substantially non-delayed pulse to said signal combiner, the second signal path comprising a time delay element for delaying pulses on the second signal path by a preselected delay amount, said delay element being adjusted to provide a preselected time delay equal to the period 1/f of the pulse frequency input to the notch filter;

said signal combiner combining the non-delayed pulse and the delayed pulse into a single output, said non-delayed pulse and delayed pulse substantially cancelling each other.

* * * * *